United States Patent [19]

Mahoney et al.

[11] Patent Number: 4,919,323
[45] Date of Patent: Apr. 24, 1990

[54] DIFFUSION BONDING NICKEL BASE ALLOYS

[75] Inventors: Murray W. Mahoney, Camerillo; Leslie M. Holmes, Jr., Simi Valley, both of Calif.

[73] Assignee: Rockwell International Corporation, El Segundo, Calif.

[21] Appl. No.: 361,616

[22] Filed: Jun. 5, 1989

[51] Int. Cl.$^5$ .................. B23K 20/02; B23K 20/16; B23K 20/22; B23K 20/24
[52] U.S. Cl. .................... 228/157; 228/193; 228/194; 228/238; 228/263.13
[58] Field of Search ............. 228/157, 265, 181, 193, 228/194, 238, 263.13

[56] References Cited

U.S. PATENT DOCUMENTS

| | | | |
|---|---|---|---|
| 2,530,552 | 11/1950 | Stoddard, Jr. | 228/249 |
| 2,961,759 | 11/1960 | Weissfloch | 228/249 |
| 3,551,996 | 1/1971 | Sumner et al. | 228/193 |
| 3,711,936 | 1/1973 | Athey et al. | 228/193 |
| 3,835,514 | 9/1974 | Pollack | 228/193 |
| 3,920,175 | 11/1975 | Hamilton et al. | 228/193 |
| 4,529,836 | 7/1985 | Powers et al. | 228/249 |
| 4,687,053 | 8/1987 | Paulus et al. | 228/157 |
| 4,820,355 | 4/1989 | Bampton | 228/157 |

FOREIGN PATENT DOCUMENTS

| | | | |
|---|---|---|---|
| 114482 | 9/1980 | Japan | 228/194 |
| 1407731 | 7/1988 | U.S.S.R. | 228/193 |

OTHER PUBLICATIONS

Metallurgical Transactions A, vol. 6A, Jun. 1975, pp. 269–1279, "Attainment of Full Interfacial Contact During Diffusion Bonding", Garmong et al.
Journal of Spacecraft and Rockets, vol. 21, No. 1, Jan.–Feb. 1984, "Superplastic Forming and Diffusion Bonding of Inconel 718", W. T. Chandler et al.

Primary Examiner—Nicholas P. Godici
Assistant Examiner—Samuel M. Heinrich
Attorney, Agent, or Firm—Craig O. Malin; H. Fredrick Hamann

[57] ABSTRACT

Nickel base alloy sheets are diffusion bonded together at a temperature which is low enough to retain the superplastic properties of the nickel base alloy. A foil and a screen of type 300 series stainless steel are placed between the sheets in the area to be bonded. This assembly is sealed in an envelope and maintained in a vacuum to protect the surfaces from oxidation, and placed within the heated platens of a press. The assembly is heated to a temperature below which rapid grain growth occurs, and sufficient pressure is applied by the press to deform the screen to create continuous contact between the surfaces to be bonded. Diffusion causes bonding of the sheets in less than six hours at temperature, without destroying the superplasticity of the nickel base alloy. In an embodiment of the invention, gas pressure is applied between the sheets in a location away from the bond to superplastically form the sheets during the bonding process.

12 Claims, 1 Drawing Sheet ved version (about 6 microns) has superplastic capabilities of up to 500 to 600% elongation.

DIFFUSION BONDING NICKEL BASE ALLOYS

STATEMENT OF GOVERNMENT INTEREST

The Government has rights in this invention pursuant to Contract No. F33615-86-C-3228 awarded by the Air Force.

BACKGROUND OF THE INVENTION

This invention relates to metal forming and joining, and particularly to superplastic forming and diffusion bonding of nickel base alloys.

Nickel base alloys such as Inconel 718 alloy have been used extensively in high-temperature structural applications because of an advantageous combination of properties. However, there is a continuing need to develop improved and less costly methods of fabricating these materials.

Some alloys such as titanium based alloys can be fabricated into parts by superplastic forming. However, conventional Inconel 718 has grains which are too large to permit the use of superplastic forming (See Journal of Spacecraft and Rockets, vol 21, No 1, Jan.-Feb., 1984, "Superplastic Forming and Diffusion Bonding of Inconel 718", by W. T. Chandler, et al). Consequently, a special fine grain Inconel 718 alloy with a grain size less than 9 microns has been developed. This fine grain alloy can be superplastically formed to elongations up to about 200%. An even finer grained version (about 6 microns) has superplastic capabilities of up to 500 to 600% elongation.

Unfortunately, the fine grain material cannot be diffusion bonded and then superplastically formed because the high temperature required for prior art diffusion bonding causes the fine grains to grow rapidly and thus destroys the superplastic properties of the material. This limits the usefulness of both prior art processes, because superplastic forming cannot be done after diffusion bonding or concurrently with diffusion bonding (such as described for titanium alloys in U.S. Pat. No. 3,920,175).

SUMMARY OF THE INVENTION

It is an object of the invention to provide a method for diffusion bonding sheets of fine grain nickel base alloys without greatly increasing the grain size of the alloy.

It is an object of the invention to provide a method for diffusion bonding sheets of nickel base alloys while maintaining the superplastic properties of the alloys.

It is an object of the invention to provide a method for concurrently diffusion bonding and superplastic forming sheets of nickel base alloys.

According to the invention, a foil and a wire mesh screen of type 300 series stainless steel is sandwiched between sheets of a nickel base alloy in an area to be bonded. This assembly is sealed in an envelope which is evacuated to vacuum levels of approximately $10^{-6}$ torr. The envelope is placed in a press so that the platens can press the assembled sheets together while it is heated to a diffusion bonding temperature which is just below the temperature at which the grains in the nickel base alloy begin to grow rapidly. The envelope is held at the diffusion bonding temperature and sufficient pressure is applied by the press to cause significant deformation in the stainless steel wire mesh screen and create a continuous path of stainless steel at the bond interface. The assembly is held under pressure and at temperature for a sufficient time to permit diffusion to occur and thereby create a strong metallurgical bond while still maintaining the superplastic properties of the nickel base alloy.

These and other objects and features of the invention will be apparent from the following detailed description taken with reference to the accompanying drawing.

DESCRIPTION OF THE INVENTION

Figure 1:
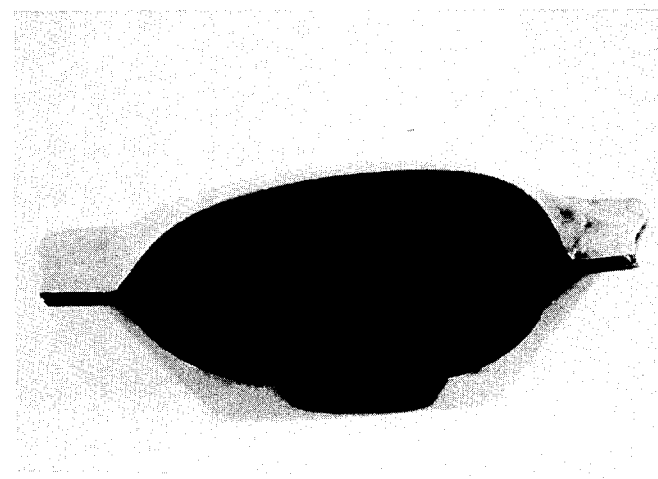
FIG. 1 is a photograph of the cross section of a superplastically formed pillow with a diffusion bonded periphery.

A small grain size is necessary to obtain superplastic properties in most alloys including the nickel base alloys such as Inconel 718. A special fine grain Inconel 718 alloy has been produced which has an average grain size of less than 6 microns. This material can be superplastically deformed up to about 500 to 600% elongation at a temperature of 982 degree C. and a strain rate in the range of about $5 \times 10^{-4}$ sec$^{-1}$ to about $1 \times 10^{-3}$ sec$^{-1}$.

Test were conducted on the fine grain Inconel 718 to determine the maximum temperature at which the material could be exposed without causing rapid grain growth with a concurrent loss in superplasticity. Grain growth was rapid for samples which were heated at 1010 degree C. for 1 to 8 hours. For samples heated at 982 degree C., the grain size remained stable with little or no grain growth. These tests were run under static conditions, that is without straining the samples. Based on these tests, it was concluded that diffusion bonding should be done at a temperature no higher than 982 degree C. in order to retain the fine grain structure and superplasticity in the Inconel 718.

Tests were also conducted on the fine grain Inconel 718 to determine the optimum temperature and strain rate for superplastic forming. This is a more complex problem because more rapid grain growth and recrystallization can occur under dynamic conditions. Additionally, conditions of temperature and strain rate must be selected to provide both maximum elongation and minimum forming time (or maximum strain rate). These tests showed that maximum superplasticity (500 to 600% elongation) could be obtained at 982 degree C. over a broad range of strain rates (about $5 \times 10^{-4}$ sec$^{-1}$ to $1 \times 10^{-3}$ sec$^{-1}$).

Attempts were made to bond Inconel 718 at 982 degree C. by the use of high pressure. The mating surfaces were thoroughly cleaned by abrasion to remove surface oxides and assure intimate metallic contact. The surfaces were pressed together at pressures up to as high as 6 ksi under a vacuum. Micrographs showed that this pressure was sufficient to flatten asperities and provide intimate contact. However, interdiffusion and grain boundary migration did not occur and the bond across the interface was incomplete.

In tests leading to the present invention, it was discovered that diffusion across the interface between the sheets of Inconel 718 occurred if an iron-base alloy was placed at the interface. Type 316 stainless steel proved satisfactory for this purpose. This is an iron base alloy which also contains nickel, chromium, and molybdenum. All these elements are also contained in the Inconel 718, and there are no harmful elements in the stainless steel (such as phosphorous in an electroless nickel coating which was previously tried). Consequently, diffusion of the elements across the interface did not introduce harmful ingredients into the material. Diffusion is driven by the large difference in composition (mainly iron and nickel) between the stainless steel (70% iron, 8% nickel) and the Inconel 718 (21% iron, 54% nickel).

The large chemical gradient between the iron base stainless steel and the nickel base alloy promotes diffusion of the elements between the parts and causes diffusion bonding of the sheets in less than six hours at temperature. There may be a slight increase in the grain size of the nickel base alloy, but the alloy still maintains a useful amount of superplasticity. If a gas inlet tube is attached to the envelope to permit the introduction of gas pressure between the nickel base alloy sheets, then the sheets can be blown outward to accomplish superplastic forming of the sheets either after diffusion bonding as described in the example below, or concurrently with diffusion bonding.

In addition to the chemical gradient provided by the stainless steel interlayer, the stainless steel provides compensation for small differences in flatness which may exist between the layers. Stainless steels have a lower yield strength than high temperature nickel base alloys at the diffusion bonding temperature. Consequently, the stainless steel screen can be deformed by the pressure and help provide the necessary intimate contact between the layers despite variations in the flatness of the mating sheets.

EXAMPLE OF DIFFUSION BONDING PROCESS

Specially processed fine-grain (about 6 microns) Inconel 718 sheet 0.5 mm thick was cut into a pair of 6.4 cm squares. A 0.64 cm wide bond area around each square was abrasively cleaned. A screen of type 316 stainless steel was placed on the bond area of one of the squares. The stainless steel wire which formed the screen had a diameter of about 25 microns and was spaced to form openings in the screen which were about 40 microns square. A type 316 stainless steel foil 0.013 mm thick was placed on top of the screen. The second square of Inconel 718 was placed on top of the foil to provide a sandwich structure with a border of stainless steel inside the top and bottom layers of Inconel 718.

The assembly was sealed inside a stainless steel vacuum bag, using a boron nitride stop-off to prevent diffusion bonding of the bag to the assembly. A tube extending into the vacuum bag was used to evacuate the bag and provide a vacuum atmosphere of less than $4 \times 10^{-6}$ torr within the bag. The vacuum bag was then placed between the platens of a press which had been preheated to 982 degree C. (temperatures in the range of 960 to 990 degree C. should be acceptable). A load of ten tons (8,900 psi on the 0.64 cm border) was applied for 4 hours. The assembly was cooled under load to below 500 degree C. and then removed from the press.

The diffusion bonded assembly was removed from the vacuum bag, and superplastically expanded to form a small pillow (see FIG. 1). Superplastic forming was accomplished by heating the assembly to 982 degree C. and applying argon gas pressure to the inside of the diffusion bonded assembly. Forming pressure ranged from 50 psi to 200 psi for a total of 20 minutes. Expansion of the pillow was accomplished by freely expanding the Inconel 718 sheets without using any clamps or supports to maintain the diffusion bond. This is evidence that a good diffusion bond was obtained because the bonds were of sufficient integrity to accommodate expansion without failure. Also, it is clear from these results, as well as from the microstructure shown in the FIG. 2, that the grain morphology was not adversely effected by the bonding procedure.

Figure 2:
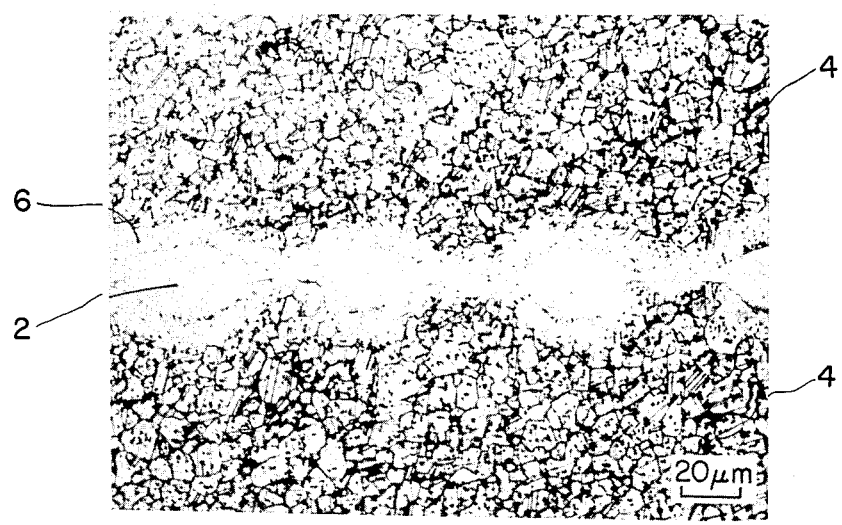
FIG. 2 is a photomicrograph of a diffusion bond between two sheets of Inconel 718 alloy.

FIG. 2 is a photomicrograph of a cross section of the bond. Remnants of the stainless steel screen 2 are shown in the interface between the Inconel 718 sheets 4. The wires forming the screen have been deformed and portions of the wire and the foil have diffused into the Inconel 718. Energy dispersive X-ray analysis showed an interaction zone 6 between the stainless steel and the Inconel 718 caused by diffusion of the iron. In the interaction zone, the iron content varied from approximately 21% on the Inconel 718 side to approximately 70% on the stainless steel side of the diffusion bond, with a continuous gradient of iron in between illustrating significant diffusion of iron. Similarly, nickel also showed a gradient illustrating significant diffusion of nickel from the Inconel 718 into the stainless steel wire.

The above example illustrates that a good diffusion bond can be obtained between sheets of Inconel 718 without destroying the superplastic properties of the material. By combining this process with prior art techniques, it is now possible to combine diffusion bonding and superplastic forming (either separately or concurrently) to fabricate a wide variety of useful structures.

Other type 300 series stainless steels (such as 301, 304, 321, and 347) should also be suitable for the interfacial layers; and other nickel base alloys similar to Inconel 718 (such as Waspaloy, Rene 41, Inconel X750) should also be diffusion bondable by this process. Specific temperatures and pressure cycles for particular material combinations can be determined by empirical methods such as described in the above example.

The preferred embodiments of this invention have been illustrated by the example described above. Modifications and additional embodiments, however, will undoubtedly be apparent to those skilled in the art. Furthermore, equivalent elements may be substituted for those illustrated and described herein, and certain features of the invention may be utilized independently of other features. Consequently, the exemplary embodiments should be considered illustrative, rather than inclusive, while the appended claims are more indicative of the full scope of the invention.

What is claimed is:

1. A method for diffusion bonding sheets of nickel base alloy comprising the steps of:
   providing a foil of type 300 series stainless steel;
   providing a screen of type 300 series stainless steel;
   providing sheets of a nickel base alloy;
   placing the foil and the screen between the sheets in the area to be bonded;
   heating the sheets and intervening foil and screen to a temperature below which rapid grain growth occurs in the sheet; and
   deforming the screen to create continuous contact between the surfaces to be bonded.

2. The method as claimed in claim 1 wherein the type 300 series stainless steel comprises type 316 stainless steel.

3. The method as claimed in claim 1 wherein the nickel base alloy comprises Inconel 718 alloy.

4. The method as claimed in claim 3 wherein the temperature is in the range of about 960 to 990 degree C.

5. The method as claimed in claim 1 wherein the step of deforming the screen comprises:
   placing the sheets and intervening foil and screen between the platens of a press;
   applying pressure to the sheets while heating the sheets and intervening foil and screen to the temperature; and
   holding the sheets and intervening foil and screen at the temperature for approximately three to six hours.

6. The method as claimed in claim 1 including the step of providing a vacuum during the steps of heating and deforming.

7. The method as claimed in claim 6 wherein the step of providing a vacuum comprises:
   sealing the sheets and the intervening foil and screen inside an envelope; and
   evacuating the atmosphere from the envelope.

8. The method as claimed in claim 1 wherein the step of deforming the foil comprises deforming the foil, and the screen.

9. The method as claimed in claim 1 wherein the nickel base alloy has an average grain size smaller than approximately 9 microns.

10. The method as claimed in claim 1 wherein the nickel base alloy is a superplastic nickel base alloy, and including the step of applying gas pressure between the sheets in an area away from the area to be bonded to superplastically form the sheets during the heating step.

11. A method for diffusion bonding sheets of Inconel 718 alloy comprising the steps of:
    providing a foil of type 300 series stainless steel;
    providing a screen of type 300 series stainless steel;
    providing sheets of Inconel 718 having an average grain size of less than about 9 microns;
    placing the foil and the screen between the sheets in the area to be bonded;
    sealing the sheets and the intervening foil and screen inside an envelope;
    evacuating the atmosphere from the envelope;
    placing the envelope with its intervening sheets and foil and screen between the platens of a press;
    applying pressure to the sheets while heating the envelope to a temperature in the range of about 960 to 990 degree C.;
    holding the envelope at the temperature for approximately three to six hours;
    cooling the envelope; and
    removing the envelope from the press.

12. The method as claimed in claim 11 including the step of applying gas pressure between the sheets in an area away from the area to be bonded to superplastically form the sheets during the heating step.

* * * * *